United States Patent [19]
Yang

[11] Patent Number: 6,128,824
[45] Date of Patent: Oct. 10, 2000

[54] HORSE MEASURING RULER STRUCTURE

[75] Inventor: Hong-Yu Yang, Taipei, Taiwan

[73] Assignee: Master Cheng Enterprise Co., Ltd., Taipei, Taiwan

[21] Appl. No.: 09/127,903

[22] Filed: Aug. 3, 1998

[51] Int. Cl.[7] .............................. G01B 3/08; G01B 5/02
[52] U.S. Cl. ............................... 33/511; 33/464; 33/484; 33/832
[58] Field of Search ............................. 33/511, 452, 464, 33/465, 472, 473, 483, 484, 485, 490, 495, 496, 497, 498, 499, 500, 512, 787, 806, 809, 810, 811, 812, 832, 833

[56] References Cited

U.S. PATENT DOCUMENTS

| 325,134 | 8/1885 | Wainwright | 33/511 |
|---|---|---|---|
| 3,526,040 | 9/1970 | Young | 33/809 |
| 4,318,228 | 3/1982 | Kimura | 33/809 |
| 4,399,616 | 8/1983 | Jansson | 33/809 |
| 5,642,569 | 7/1997 | Palmer | 33/809 |
| 6,003,235 | 12/1999 | Chen | 33/512 |

*Primary Examiner*—Andrew H. Hirshfeld
*Attorney, Agent, or Firm*—Browdy and Neimark

[57] ABSTRACT

A horse measuring ruler structure including a vernier main body, a fixing stopper block, two resilient slide blocks, a locating ruler, a locating device, an inner ruler, an outer ruler, a, protective frame and a locking device. The vernier main body is composed of a trapezoid board and two panels rightward extending respectively from middle sections of front and rear sides of the trapezoid board. The upper and lower sections of the right side of the trapezoid board are respectively formed with two T-shaped sockets. The left end of the locating ruler is fitted into the space between the right sections of the panels of the vernier main body and pivotally located by the locating device. The locking device is fitted into the circular receiving chamber of lower end of the inner ruler. The protective frame is fitted onto upper end of the outer ruler and the inner ruler is fitted into the outer ruler. The resilient slide blocks are fitted into the T-shaped cavities of the trapezoid board of the vernier main body. The inner ruler is passed through the space between the front and rear panels of the vernier main body. Two fixing pins are passed through the fixing stepped holes of the front and rear panels, whereby the vernier main body is engaged on the inner ruler by means of the resilient slide blocks.

2 Claims, 4 Drawing Sheets

HORSE MEASURING RULER STRUCTURE

BACKGROUND OF THE INVENTION

The present invention relates to a horse measuring ruler structure for measuring the height of the back of a horse. The ruler can be easily quickly telescoped without disassembling any component. When measuring, the outer and inner rulers are stably fixed so that the measuring operation can be conveniently performed without affecting the accuracy of measuring. When vertically moving the vernier main body and the locating ruler for measuring the horse, the inner ruler is protected from being abraded so as to prolong the using life of the ruler.

FIG. 1 shows a conventional horse measuring ruler structure for measuring the height of the horse back. Such ruler is composed of a vernier 1, an upper ruler 2 and a lower ruler 3. A top face of left section of the vernier 1 is inserted with a level 4. The left side of the vernier 1 is formed with a fitting notch 1a. The opening of the fitting notch 1a fixedly clamps a trapezoid stopper board 5. A middle section of right side of the stopper board 5 is fixedly connected with a V-shaped leaf spring 6. The back faces of the upper and lower rulers 2, 3 are pivotally connected with each other by a hinge 7. A lower end section of front face of the upper ruler 2 is disposed with a latch post 2a. The upper end section of front face of the lower ruler 3 is disposed with a latch hook 3a. When the upper and lower rulers 2, 3 are stretched into a straight line via the hinge 7, the latch hook 3a of the lower ruler 3 is latched with the latch post 2a of the upper ruler 2 to fix the upper and lower rulers 2, 3. The vernier 1 via the fitting notch 1a is fitted onto the upper ruler 2 with two ends of the leaf spring 6 resiliently engaged against the left side of the upper ruler 2.

According to the above arrangement, the conventional horse measuring ruler has some shortcomings as follows:

1. When folding the ruler, it is necessary to separate the vernier 1 from the upper ruler 2 and unlatch the latch hook 3a from the latch post 2a. Then the upper and lower rulers 2, 3 can be folded via the hinge 7. Such procedure is troublesome.

2. After stretched, the upper and lower rulers 2, 3 are fixedly latched with each other by means of the latch hook 3a and the latch post 2a in cooperation with the hinge 7. In use, the upper and lower rulers 2, 3 tend to swing to affect the measuring operation and accuracy.

3. When vertically moving the vernier 1 for measuring the horse, the two ends of the V-shaped leaf spring 6 will scrape the left side of the upper ruler 2 and thus shorten the width of the upper ruler 2. This may disable the vernier 1 from engaging with the upper ruler 2 and thus shorten using life of the measuring ruler.

SUMMARY OF THE INVENTION

It is therefore a primary object of the present invention to provide a horse measuring ruler structure in which when retracting the inner ruler, a locking device is pressed, permitting the inner ruler to be easily telescoped into the outer ruler and a locating device is pressed, permitting the locating ruler to be downwardly pivoted and attached to the outer ruler.

It is a further object of the present invention to provide the above horse measuring ruler structure in which by means of a protective frame and the locking device, the inner and outer rulers are stably fixed after being extended. Therefore, the accuracy of a measuring operation will not be affected.

It is still a further object of the present invention to provide the above horse measuring ruler structure in which when vertically moving the vernier main body and the locating ruler for measuring the horse, the inner ruler is protected from being scraped so that the vernier main body can be firmly engaged with the inner ruler and the scales marked on the inner ruler are protected from being abraded so as to prolong the using life of the ruler.

The present invention can be best understood through the following description and accompanying drawings, wherein:

BRIEF DESCRIPTION OF THE DRAWINGS

FIGS. 2A–2D are enlarged views of elements in FIG. 2;

FIG. 5 is a sectional view taken along lines 5—5 of FIG. 2D.

DETAILED DESCRIPTION OF THE PREFERRED EMBODIMENT

Figure 1:
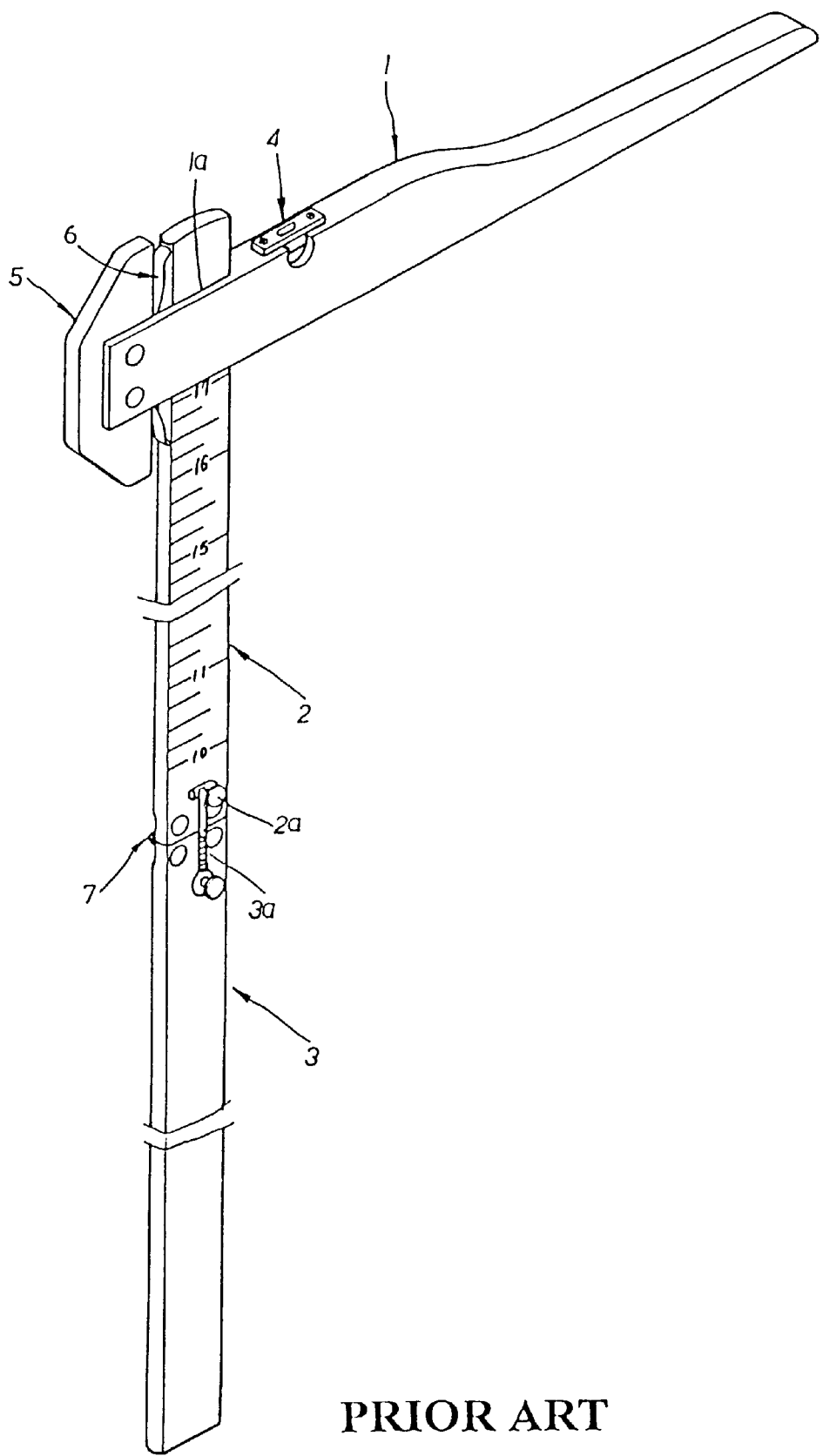
FIG. 1 is a perspective view of a conventional horse measuring ruler.
Figure 2:
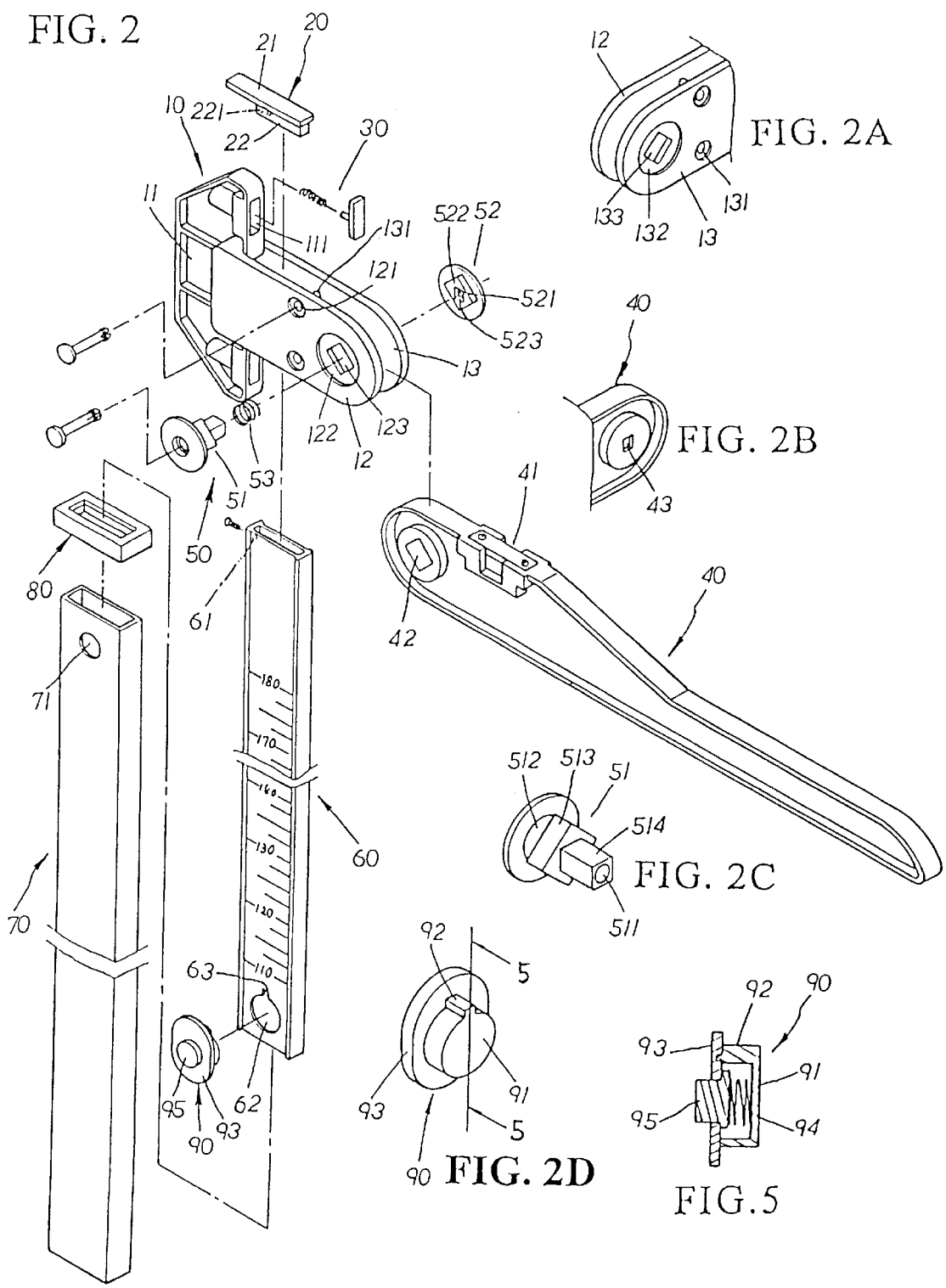
FIG. 2 is a perspective exploded view of the present invention.

Please refer to FIGS. 2–2D. The present invention includes a vernier main body 10, a fixing stopper block 20, two resilient slide blocks 30, a locating ruler 40, a locating device 50, an inner ruler 60, an outer ruler 70, a protective frame 80 and a locking device 90. The vernier main body 10 is composed of a trapezoid board 11 and two panels 12, 13 rightward extending respectively from middle sections of front and rear sides of the trapezoid board 11. The upper and lower sections of the right side of the trapezoid board 11 are respectively formed with two T-shaped sockets 111. The middle sections of the front and rear panels 12, 13 are respectively formed with two fixing stepped holes 121, 131. The right side of front face of the front panel 12 is disposed with a circular dent 122. The center of the bottom of the circular dent 122 is formed with a large square locating hole 123. The right side of the back face of the rear panel 13 is disposed with a circular dent 132. The center of the bottom of the circular dent 132 is formed with a large square locating hole 133. The fixing stopper block 20 includes a stopper plate 21 and a plug block 22 extending from the right side of the bottom face of the stopper plate 21. The left face of the plug block 22 is formed with a locking thread hole 221. The level 41 is inserted on top face of left side of the locating ruler 40. The left end section of the locating ruler 40 is formed with a large square cavity 42. The bottom of the cavity 42 is formed with a small square fitting hole 43. The locating device 50 is composed of a locating pin 51, a locating cap 52 and a compression spring 53. The locating pin 51 is formed with a central through hole 511, having a circular section 512 and a large and a small square locating blocks 513, 514 connected with the circular section 512. The locating cap 52 is also formed with a central through hole 521. The inner side of the locating cap 52 is disposed with a large square locating block 522 having a central small square mating socket 523. The inner ruler 60 is a hollow rectangular tube body shaped as an I-beam. The upper end of left side of the inner ruler 60 is formed with a locking hole 61. The lower end of the front face thereof is disposed with a circular receiving chamber 62. The upper edge of the receiving chamber 62 is formed with a restricting notch 63. The outer ruler 70 is also a rectangular tube body. The upper end of front face of the outer ruler 70 is formed with a circular through hole 71. The locking device 90 is composed of a circular box body 91 and an elliptic cover 93 sealing the box body 91. The box body 91 has a restricting block 92 on upper edge. The sealing cover 93 has a central circular hole in which a push button 95 is disposed and outward pushed by a spring 94.

Figure 3:
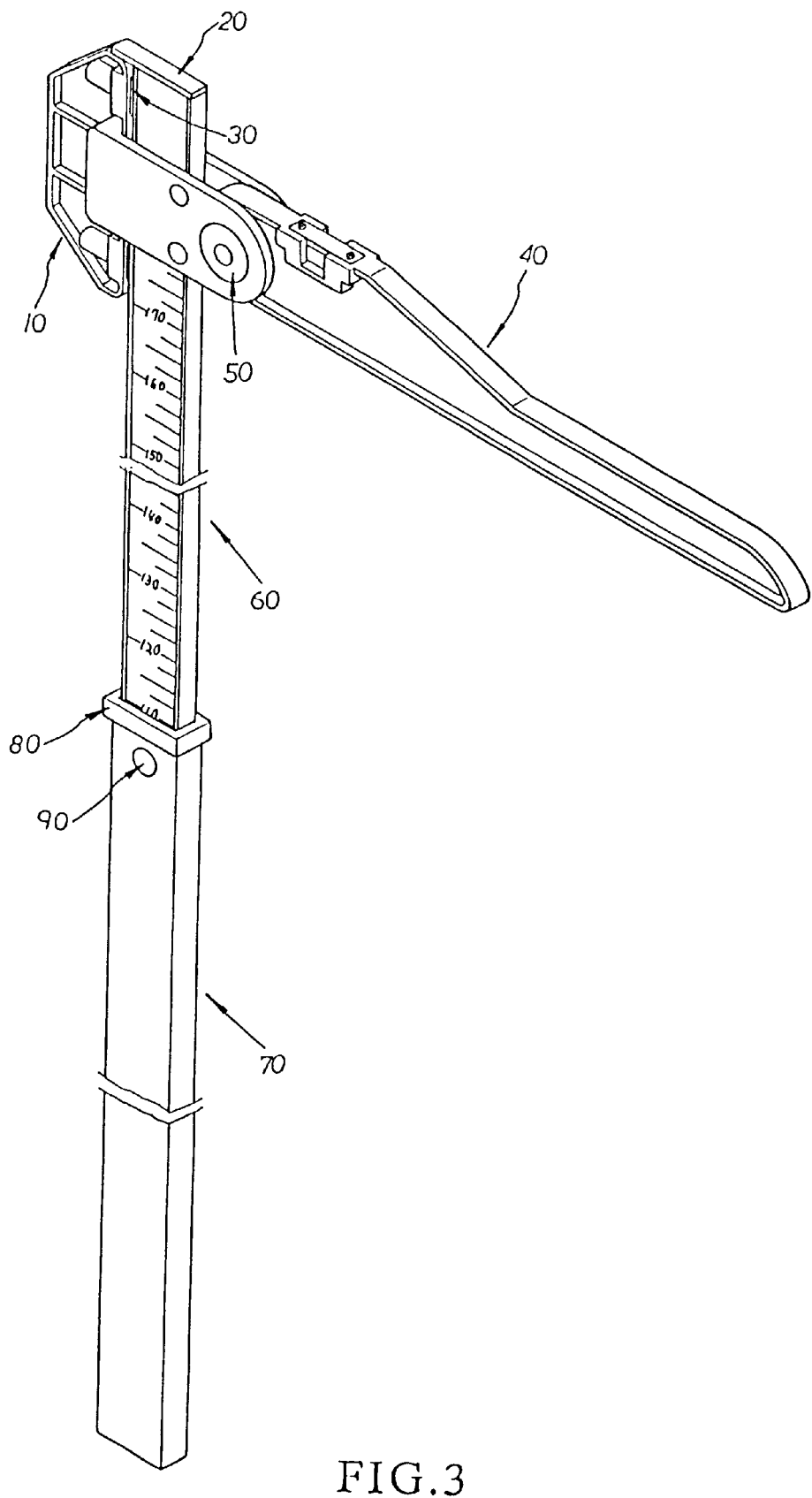
FIG. 3 is a perspective assembled view of the present invention.

Please refer to FIG. 3. When assembled, the left end of the locating ruler 40 is fitted into the space between the right sections of the panels 12, 13 of the vernier main body 10. Then the compression spring 53 of the locating device 50 is fitted around the small square locating block 514 of the locating pin 51, which is fitted into the small square fitting hole 43 of the locating ruler 40. The large square locating block 513 of the locating pin 51 is engaged between the large square locating hole 123 of the front panel 12 of the vernier main body 10 and the large square receiving chamber 42 of the locating ruler 40 so as to locate the locating ruler 40. The small square mating socket 523 of the locating cap 52 of the locating device 50 is fitted with the end of the small square locating block 514 of the locating pin 51 and the large square locating block 522 of the locating cap 52 is engaged in the large square locating hole 133 of the rear panel 13 of the vernier main body 10. A fixing pin is passed through the locating pin 51 and the locating cap 52 to fix the same. The box body 91 of the locking device 98 is fitted into the receiving chamber 62 of the inner ruler 60 with the restricting block 92 engaged in and restricted by the restricting notch 63 of the receiving chamber 62. The protective frame 80 is fitted onto upper end of the outer ruler 70 and the inner ruler 60 is fitted into the outer ruler 70. The push button 95 of the locking device 90 is resiliently pushed by the spring 94 and engaged in the circular through hole 71 of the outer ruler 70. The resilient slide blocks 30 are fitted into the T-shaped cavities 111 of the trapezoid board 11 of the vernier main body 10. The inner ruler 60 is passed through the space between the front and rear panels 12, 13 of the vernier main body 10 to leftward compress the resilient slide blocks 30. Two fixing pins are passed through the fixing stepped holes 121, 131 of the front and rear panels 12, 13. The vernier main body 10 is engaged on the inner ruler 60 by means of the resilient slide blocks 30. The plug block 22 of the fixing stopper block 20 are plugged into the upper end of the inner ruler 60 and a fixing screw is passed through the locking hole 61 of the inner ruler 60 and tightened in the locking thread hole 221 of the plug block 22. The stopper plate 21 of the fixing stopper block 20 prevents the inner ruler 60 from separating from the vernier main body 10.

Figures 4, 4A, 4B:
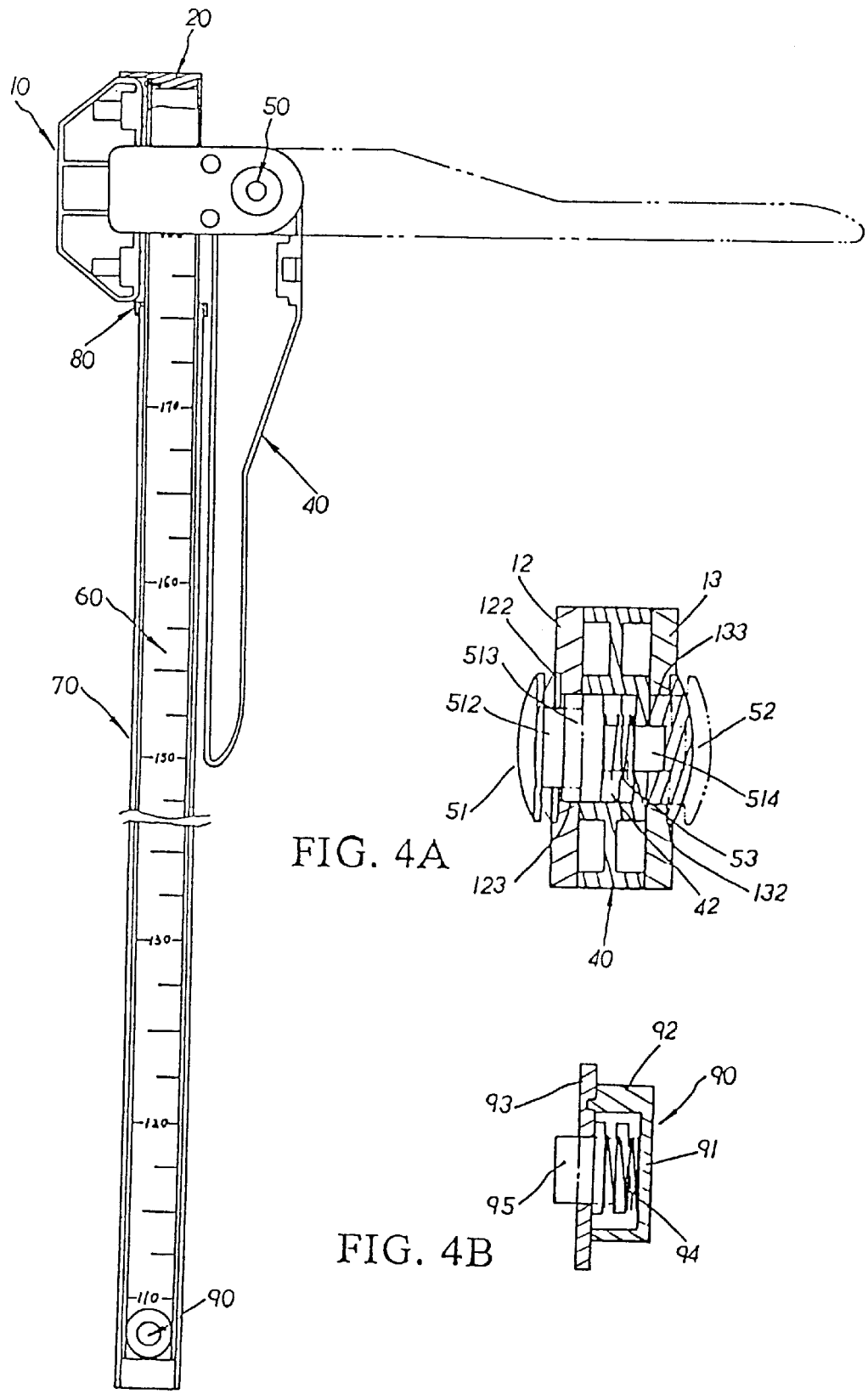
FIG. 4 shows the telescoping operation of the present invention.
FIGS. 4A and 4B are enlarged sectional views of elements in FIG. 4.

Please refer to FIGS. 4–4B. When retracting the inner ruler, the push button 95 of the locking device 90 is pressed to compress the spring 94, whereby the push button 95 is separated from the circular through hole 71 of the outer ruler 70, permitting the inner ruler 60 together with the locking device 90 to be telescoped into the outer ruler 70. Also, the locating pin 51 of the locating device 50 is pressed to compress the compression spring 53 so as to disengage the large square locating block 513 from the large square locating hole 123 of the front panel 12 of the vernier main body 10 to be received in the large square receiving chamber 42 of the locating ruler 40. Also, the large square locating block 522 of the locating cap 52 is disengaged from the large square locating hole 133 of the rear panel 13, permitting the locating ruler 40 to be pivoted down to attach to the right side of the outer ruler 70 to complete the retraction operation.

According to the above arrangement, the present invention has the following advantages:

1. The inner ruler 60 can be easily telescoped into the outer ruler 70 and the locating ruler 40 can be easily pivoted downward to attach to the outer ruler 70.

2. By means of the protective frame 80 and the locking device 90, the inner and outer rulers 60, 70 are stably fixed after extended without swinging. Therefore the accuracy of measuring operation will not be affected.

3. When vertically moving the vernier main body 10 and the locating ruler 40 for measuring the horse, the resilient slide blocks 30 are resiliently slid along the left side of the inner ruler 60 without damaging the inner ruler 60. Therefore, the inner ruler 60 can be firmly engaged with the vernier main body 10. In addition, the inner ruler 60 is formed with an I-beam profile so that the scales marked on the surface thereof are protected from being abraded so as to prolong the using life of the ruler.

The above description and accompanying drawings are only used to illustrate one embodiment of the present invention. Any modification or variation derived from the embodiment should fall within the scope of the present invention.

What is claimed is:

1. A horse measuring ruler structure comprising a vernier main body, a fixing stopper block, two resilient slide blocks, a locating ruler, a locating device, an inner ruler, an outer ruler, a Protective frame and a locking device, a level being inserted on a top face of a left section of the locating ruler, the locking device being composed of a circular box body and an elliptic cover sealing the box body, the box body having a restricting block on a upper edge thereof, the elliptic cover having a central circular hole in which a push button is disposed and outward Pushed by a spring, said ruler structure being further characterized in that:

the vernier main body is comprised of a trapezoid board and two panels rightwardly extending respectively from middle sections of front and rear sides of the trapezoid board, the upper and lower sections of the right side of the trapezoid board being respectively formed with two T-shaped sockets, each middle section of the front and rear panels being respectively formed with two fixing stepped holes, a right side of the front face of the front panel being disposed with a circular dent, the center of the circular dent being formed with a large square locating hole, the right side of the back face of the rear panel being disposed with a circular dent, the center of the circular dent being formed with a large square locating hole;

the fixing stopper block includes a stopper plate and a Plug block extending from the right side of the bottom face of the stopper plate;

the left end section of the locating ruler is formed with a large square cavity, the cavity being formed with a small square fitting hole;

the locating device is composed of a locating pin, a locating cap and a compression spring, the locating pin being formed with a central through hole, said locating pin having a circular section and a large and a small square locating block connected with the circular section, the locating cap being also formed with a central through hole, the inner side of the locating cap being disposed with a large square locating block having a central small square mating socket secured to the small square locating block of the locating pin;

the inner ruler is a hollow rectangular tube body shaped as an I-beam, the lower end of front face of the inner ruler being disposed with a circular receiving chamber, an upper edge of the receiving chamber being formed with a restricting notch for receiving the restricting block of the box body;

the outer ruler is a rectangular tube body, an upper end of the front face of the outer ruler being formed with a circular through hole the inner ruler being fitted into the outer ruler; and wherein, the left end of the locating ruler is fitted into the space between the right sections of the panels of the vernier main body and pivotally located by the locating device extending through the large square locating holes of the front and rear panels such that the locating pin is depressible to compress the compression spring thereof to disengage the large square locating block of the locating pin from the large square locating hole of the front panel and to disengage the large square locating block of the locating cap from the large square locating hole of the rear panel to permit rotation of the locating ruler relative to the front and rear panels, the locking device being fitted into the circular receiving chamber of lower end of the inner ruler, wherein the push button is positionable in the circular through hole of the outer ruler to prevent relative movement of the inner and outer rulers, said locking device being depressible to compress the spring thereof to separate the push button from the circular through hole of the outer ruler to permit relative movement of the inner and outer rulers, the protective frame being fitted onto upper end of the outer ruler, the resilient slide blocks being fitted into the T-shaped sockets of the trapezoid board of the vernier main body, the inner ruler being passed through the space between the front and rear panels of the vernier main body, two fixing pins being passed through the fixing stepped holes of the front and rear panels, the vernier main body being engaged on the inner ruler by means of the resilient slide blocks, the Plug block of the fixing stopper block being plugged into the upper end of the inner ruler, the stopper plate of the fixing stopper block preventing the inner ruler from separating from the vernier main body.

2. A horse measuring ruler structure as claimed in claim 1, wherein the left side of the Plug block of the fixing stopper block is formed with a locking thread hole and the upper end section of left side of the inner ruler is formed with a locking hole, a fixing screw being passed through the locking hole of the inner ruler and tightened in the locking thread hole of the plug block to lock the the fixing stopper block with the inner ruler.

* * * * *